(12) United States Patent
Héroux et al.

(10) Patent No.: US 9,077,450 B2
(45) Date of Patent: Jul. 7, 2015

(54) WAVELENGTH DIVISION MULTIPLEXING WITH MULTI-CORE FIBER

(71) Applicant: INTERNATIONAL BUSINESS MACHINES CORPORATION, Armonk, NY (US)

(72) Inventors: Jean Benoit Héroux, Tokyo (JP); Masao Tokunari, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 14/020,478

(22) Filed: Sep. 6, 2013

(65) Prior Publication Data

US 2015/0071638 A1    Mar. 12, 2015

(51) Int. Cl.
| | |
|---|---|
| G02B 6/42 | (2006.01) |
| H04B 10/25 | (2013.01) |
| H04J 14/02 | (2006.01) |

(52) U.S. Cl.
CPC ............ *H04B 10/2504* (2013.01); *H04J 14/02* (2013.01)

(58) Field of Classification Search
CPC ............. H04B 10/2504; G02B 6/2817; G02B 6/4214; H01J 14/02; H04J 14/0227
USPC ......................................... 385/47; 399/77–88
See application file for complete search history.

(56) References Cited

U.S. PATENT DOCUMENTS

| | | | |
|---|---|---|---|
| 6,415,080 B1 * | 7/2002 | Sappey et al. .................... 385/37 |
| 6,563,976 B1 * | 5/2003 | Grann et al. ..................... 385/24 |
| 6,856,435 B2 * | 2/2005 | Richard et al. .................. 398/43 |
| 6,870,976 B2 * | 3/2005 | Chen et al. ....................... 385/14 |
| 7,693,424 B1 | 4/2010 | Krishnamoorthy et al. | |
| 8,472,763 B1 * | 6/2013 | Liu et al. ......................... 385/37 |
| 2006/0039645 A1 * | 2/2006 | Uesugi ............................ 385/18 |
| 2012/0321309 A1 | 12/2012 | Barry et al. | |
| 2013/0058607 A1 | 3/2013 | Binkert et al. | |

FOREIGN PATENT DOCUMENTS

EP          1402376 B1    6/2010

OTHER PUBLICATIONS

Benner, A., et al. "Exploitation of Optical Interconnects in Future Server Architectures" IBM Journal of Research and Development. vol. 49, No. 4.5. Jul. 2005. (21 Pages).

Lee, B., et al. "End-to-End Multicore Multimode Fiber Optic Link Operating up to 120 GB/S" Journal of Lightwave Technology, vol. 30, No. 6. Mar. 2012. (7 Pages).

(Continued)

*Primary Examiner* — Ellen Kim
(74) *Attorney, Agent, or Firm* — Tutunjian & Bitetto, P.C.; Vazken Alexanian

(57) ABSTRACT

Optical systems for wavelength division multiplexing and wavelength division demultiplexing with a multi-core fiber, and methods of their fabrication, are disclosed. The systems include a coupling mirror with a plurality of angled surfaces that are configured to direct light to or from different cores of a multi-core fiber. In addition, the multiplexer systems can further include laser chips for generating light, while the demultiplexer systems can include photodiode arrays for detecting light from the multi-core fiber. The systems can also include a guiding structure comprising filters/micro-mirrors to direct light from the lasers or to the photodiodes.

20 Claims, 10 Drawing Sheets

(56) References Cited

OTHER PUBLICATIONS

Lemoff, B., et al. "Demonstration of a Compact Low-Power 250-GB/S Parallel-WDM Optical Interconnect" IEEE Photonics Technology Letters, vol. 17, No. 1. Jan. 2005. pp. 220-222.

Lemoff, B., et al. "Maui: Enabling Fiber-to-the-Processor With Parallel Multi Wavelength Optical Interconnects" Journal of Lightwave Technology, vol. 22, No. 9. Sep. 2004. pp. 2043-2054.

Liu, H., et al. "Scaling Optical Interconnects in Datacenter Networks Opportunities and Challenges for WDM" 2010 18th IEEE Symposium on High Performance Interconnects. Aug. 2010. (4 Pages).

Pepeljugoski, P., et al. "Low Power and High Density Optical Interconnects for Future Supercomputers" Optical Fiber Communication (OFC), collocated National Fiber Optic Engineers Conference. Mar. 2010. (3 Pages).

* cited by examiner

WAVELENGTH DIVISION MULTIPLEXING WITH MULTI-CORE FIBER

BACKGROUND

1. Technical Field

The present invention relates to optical systems, and, more particularly, to systems, methods and devices for wavelength division multiplexing and demultiplexing with multi-core fibers.

2. Description of the Related Art

The development of high performance computers compels the development of new technologies for high bandwidth, low power data transfer. Optical interconnects are currently used in the most advanced systems for rack-to-rack and drawer-to-drawer communication. Unfortunately, currently available optical data transfer technologies were primarily developed for the telecommunication industry. As a result, they are generally costly to implement and frequently do not meet the density and power specifications of advanced computers. For example, a typical rack-to-rack configuration employs over 5000 optical fibers.

SUMMARY

One embodiment of the present invention is directed to an optical system for wavelength division demultiplexing with a multi-core fiber. The system includes a mirror, a plurality of filters and a plurality of photodiodes. The mirror includes a plurality of angled surfaces that are configured to reflect light from the multi-core fiber. In addition, each of the filters is configured to receive at least a portion of the reflected light, filter at least one respective wavelength from the portion of the reflected light and transmit at least one other respective wavelength of said portion. Further, the plurality of photodiodes are aligned with the filters such that each given photodiode of the plurality of photodiodes receives the light of the transmitted wavelength from the filter to which the given photodiode is aligned.

Another embodiment is directed to an optical system for wavelength division multiplexing with a multi-core fiber. The system includes a mirror, a plurality of sets of laser chips and a guiding structure. The mirror includes a plurality of angled surfaces, where each of the angled surfaces is configured to direct light to a different core of the multi-core fiber. Further, in each set of the sets of laser chips, each laser chip transmits light at a different wavelength. In addition, the guiding structure is configured to combine at least a portion of the light transmitted from at least one of the sets of laser chips and direct the combined light to the mirror.

An alternative embodiment is directed to an optical system for wavelength division multiplexing with a multi-core fiber. The system includes a mirror, arrays of laser chips and a plurality of waveguides. The mirror includes a plurality of angled surfaces, where each of the angled surfaces is configured to direct light to a different core of the multi-core fiber. In each array of the arrays of laser chips, each laser chip transmits light at a common wavelength. Further, the plurality of waveguides is configured to combine the light transmitted from the arrays and direct the combined light to the coupling mirror.

Another embodiment is directed to a method for fabricating an optical system for wavelength division demultiplexing with a multi-core fiber. In accordance with the method, a resin is molded to define an element with a plurality of angled surfaces. Further, a plurality of filters are formed around the element, where each of the filters is configured to filter at least one respective wavelength and transmit at least one other respective wavelength. In addition, reflective surfaces are formed on the plurality of angled surfaces. Moreover, an additional resin is formed over the element and over the plurality of filters to complete a guiding structure. Further, arrays of photodiodes are affixed to the guiding structure below the plurality of filters.

An alternative embodiment is directed to method for fabricating an optical system for wavelength division multiplexing with a multi-core fiber. In accordance with the method, a resin is molded to define an element with a plurality of angled surfaces. In addition, a plurality of micro-mirrors are formed around the element. Moreover, reflective surfaces are formed on the plurality of angled surfaces. The method further includes depositing an additional resin over the element and over the plurality of micro-mirrors to complete a guiding structure. Further, a plurality of sets of laser chips are affixed to the guiding structure below the micro-mirrors, where, in each set of the sets of laser chips, each laser chip transmits light at a different wavelength.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Improved optical interconnects should be developed to enable the transfer a large amount of data with low fiber volume at low cost and low power within an advanced computing system. Wavelength and spatial multiplexing schemes can be employed to address this need. For example, multimode hexagonal multi-core fibers with standard clad dimensions can be employed to operate six data channels instead of one in a conventional fiber as a spatial multiplexing scheme with relatively good mechanical strength. Further, specialized vertical cavity surface emitting laser (VCSEL) chip sets with four wavelengths can be used in wavelength division multiplexing schemes.

Figure 1:
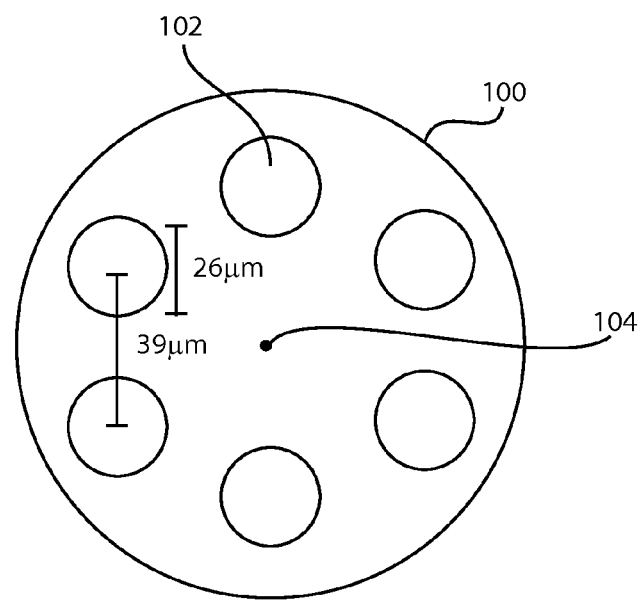
FIG. 1 is a cross-sectional view of a exemplary multi-core fiber that can be employed with optical systems in accordance with exemplary embodiments of the present invention.
Figure 2:
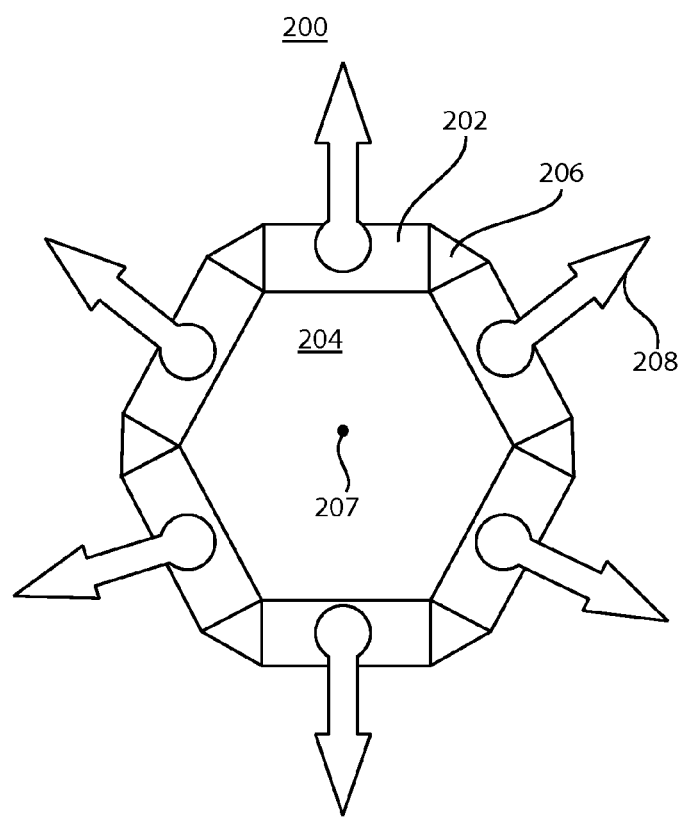
FIG. 2 is a top view of an exemplary coupling mirror that can be employed in wavelength division multiplexing systems and in wavelength division demultiplexing systems in accordance with exemplary embodiments of the present invention.

The exemplary embodiments of the present invention described herein provide a relatively high bandwidth in a single fiber by utilizing a novel structure to perform wavelength division multiplexing with a multi-core fiber. In particular, a coupling mirror that includes a plurality of different surfaces that are each dedicated to a different core of a multi-core fiber can be developed and utilized in wavelength demultiplexing and multiplexing schemes to achieve a high bandwidth. For example, FIG. 1 illustrates a multi-core fiber 100 that includes six different cores 102 that are disposed in a hexagonal arrangement around an axis 104 of the fiber. In a preferred embodiment, to implement multiplexing or demultiplexing with the fiber 100, a hexagonal coupling mirror 200 can be employed and aligned with the fiber such that each surface 202 is aligned with a different corresponding core 102. FIG. 2 provides a top view of the mirror 200 that can be employed for wavelength division multiplexing (WDM) and wavelength division demultiplexing (WDDM). For illustrative purposes, FIG. 2 depicts reflected light beams 208 when the mirror 200 is used for demultiplexing. The mirror 200 can further include minor surfaces 206 disposed between the six coupling mirror surfaces 202 and can include a hexagonal central portion 204. The mirror 200 can be butt-coupled to the fiber 100 for WDM and WDDM. In a preferred embodiment, the hexagonal structure of the coupling mirror 200 is designed to guide four wavelengths into/from each core of the fiber using standard VCSEL chips and photo-diode arrays with a standard 250 µm pitch. However, it should be understood that the coupling surfaces 202 can be employed to guide any number of wavelengths of the optical transmitter/receiver system in which the coupling mirror 200 is employed. Moreover, a fiber with a different number of cores 102 and a mirror with the matching number of surfaces 202 could be employed.

As will be appreciated by one skilled in the art, aspects of the present invention may be embodied as a system, method or device. Aspects of the present invention are described below with reference to flowchart illustrations and/or block diagrams of methods, apparatus (systems) and devices according to embodiments of the invention. It will be understood that each block of the flowchart illustrations and/or block diagrams, and combinations of blocks in the flowchart illustrations and/or block diagrams, can be implemented, in some alternative implementations, in an order that is different from the order noted in the figures. For example, two blocks shown in succession may, in fact, be executed substantially concurrently, or the blocks may sometimes be executed in the reverse order, depending upon the functionality involved.

It is to be understood that the present invention will be described in terms of a given illustrative architecture having a substrate; however, other architectures, structures, substrate materials and process features and steps may be varied within the scope of the present invention.

It will also be understood that when an element described as a layer, region or substrate is referred to as being "on" or "over" another element, it can be directly on the other element or intervening elements may also be present. In contrast, when an element is referred to as being "directly on" or "directly over" another element, there are no intervening elements present. Similarly, it will also be understood that when an element described as a layer, region or substrate is referred to as being "beneath" or "below" another element, it can be directly beneath the other element or intervening elements may also be present. In contrast, when an element is referred to as being "directly beneath" or "directly below" another element, there are no intervening elements present. Further, the term "beneath" with respect to an element should be understood to mean below the element in a perpendicular line between the element and the feature described as being beneath an element. Thus, the term "beneath" should not be understood to mean that a feature is only in a different plane with respect to the element. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an optical system may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of optical systems. The resulting optical system can be distributed in raw form, as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the system is then integrated with other chips, discrete circuit elements, and/or other signal processing devices as part of either (a) an intermediate product, such as a motherboard, or (b) an end product. The end product can be any product that employs the optical system.

It should be understood that reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
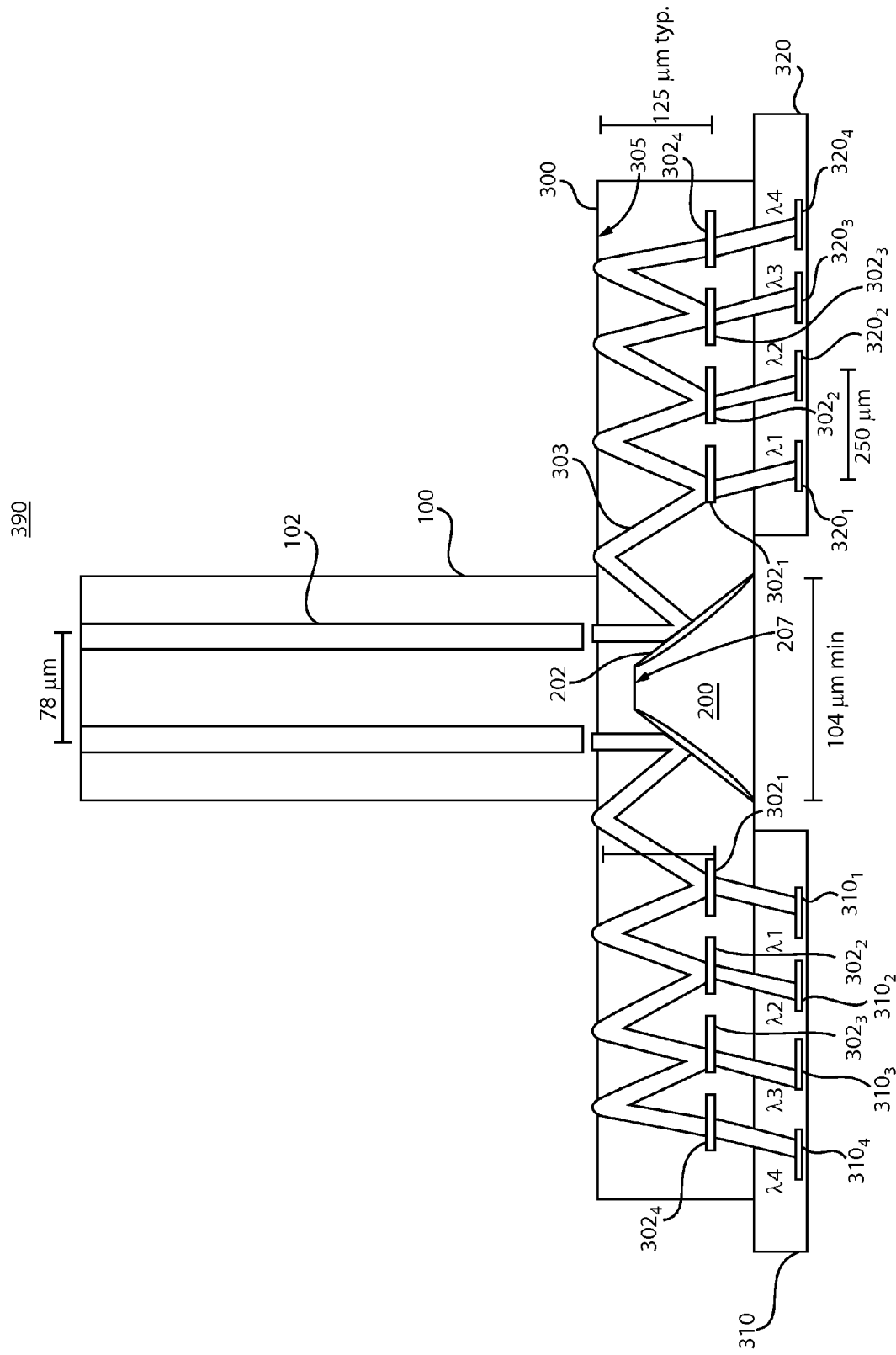
FIG. 3 is a cross-sectional view of a wavelength division demultiplexing system in accordance with an exemplary embodiment of the present invention.

Referring again to the drawings in which like numerals represent the same or similar elements and in particular FIG. 3, a cross-sectional view of a demultiplexer/receiver optical system 390 is illustrated. It should be noted that all dimensions noted in each of the figures are only examples and are provided for illustrative purposes only. The provision of the dimensions should not be understood to in any way limit the invention, as other dimensions can be employed. As depicted in FIG. 3, a guiding structure 300 is butt-coupled to a fiber such that each angled surface 202 is aligned with and receives/reflects light 303 transmitted from a different core 102 of the multi-core fiber 100. In other words, each coupling surface 202 is aligned with only one, respective core of the fiber 100. Here, the central axis 207 of the coupling mirror 200 is aligned with and disposed beneath the central axis 104 of the fiber 100. Each coupling surface 202 of the mirror is elliptical to ensure that the light beams are reflected and collimated. Alternatively, the structure 300 can be configured such that one or several of the reflections on the top, inner surface 305 collimate the beams. Other collimation schemes, such as schemes using lenses, can also be employed to collimate the beams.

Figure 4:
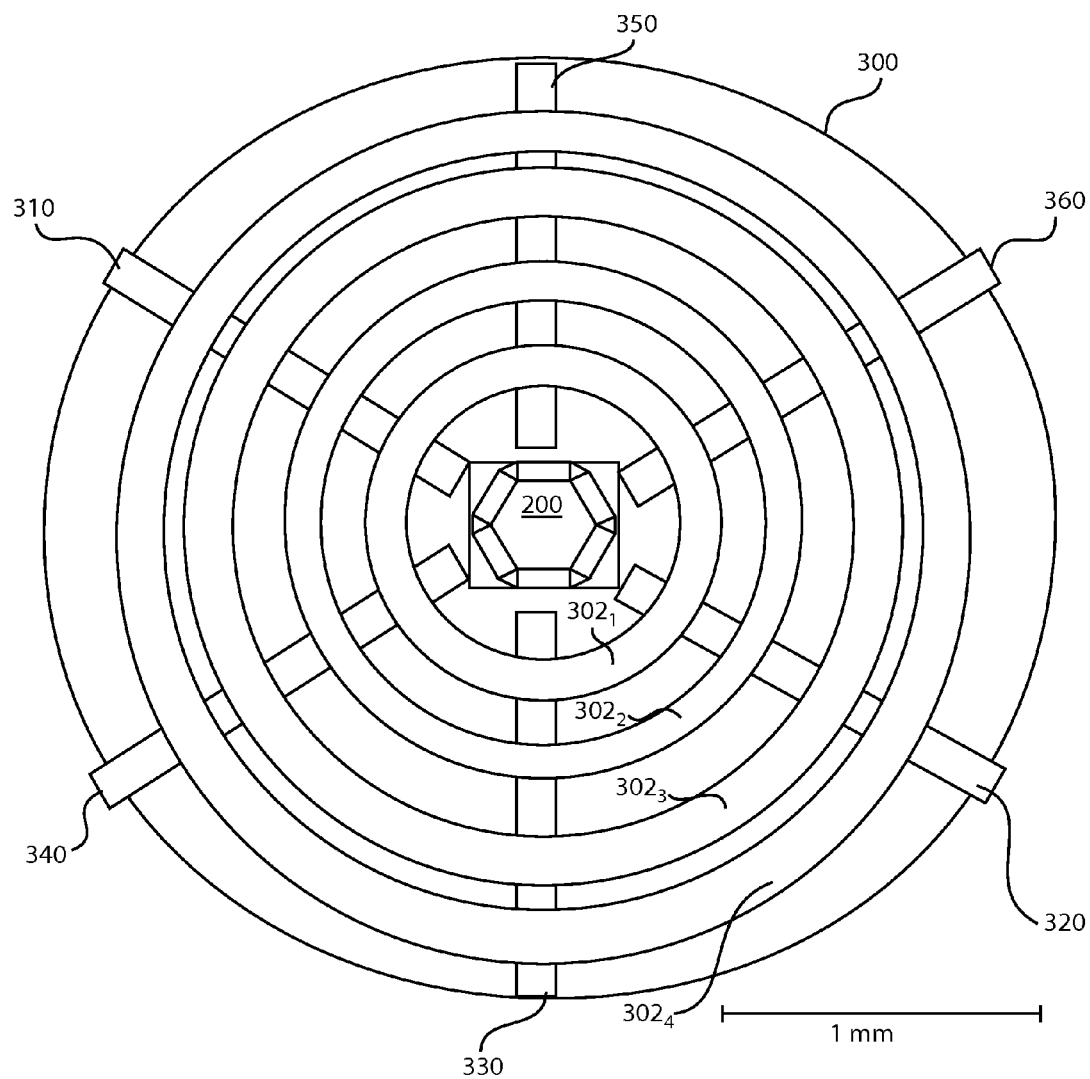
FIG. 4 is a top view of a wavelength division demultiplexing system in accordance with an exemplary embodiment of the present invention.

As illustrated in FIG. 3, the system 390 includes photodiode arrays 310 and 320 that are affixed to a bottom surface of the structure 300. The photodiode array 310 includes photodiodes $310_1$-$310_4$ while the photodiode array 320 includes photodiodes $320_1$-$320_4$. In the arrangement depicted in FIG. 3, the photodiodes $310_1$-$310_4$ and photodiodes $320_1$-$320_4$ are disposed beneath filters $302_1$-$302_4$, where photodiodes $310_1$ and $320_1$ are disposed beneath filter $302_1$, photodiodes $310_2$ and $320_2$ are disposed beneath filter $302_2$, photodiodes $320_3$ and $320_3$ are disposed beneath filter $302_3$ and photodiodes $320_4$ and $320_4$ are disposed beneath filter $302_4$. As depicted in FIG. 4, which provides a top view of the structure 300 and the photodiode arrays 310 and 320, the filters $302_1$-$302_4$ are formed as concentric discs that are disposed around the mirror 200. Here, the system 390 includes other photodiode arrays 330, 340, 350 and 360 to match the number of cores in the fiber 100. Thus, there are six photodiode arrays with four channels for each photodiode array. In the preferred embodiment, the minimum space between the photo-diodes within an array is 250 μm. The photodiode arrays 330, 340, 350 and 360 are configured in the same manner as the photodiode arrays 310 and 320 and are aligned with the filters $302_1$-$302_4$ in the same manner in which the photodiode arrays 310 and 320 are aligned with the filters. As such, each of the photodiode arrays are sensitive to all four wavelengths $\lambda_1$-$\lambda_4$ transmitted by each core 102 of the multi-core fiber 100. However, other numbers of wavelengths can be employed with appropriate modification of the number of photodiodes in each array.

In accordance with a preferred embodiment, filter $302_1$ filters/reflects wavelengths $\lambda_2$-$\lambda_4$ and transmits wavelength $\lambda_1$, filter $302_2$ filters/reflects wavelengths $\lambda_3$ and $\lambda_4$ and transmits wavelength $\lambda_2$, filter $302_3$ filters/reflects wavelengths $\lambda_4$ and transmits wavelength $\lambda_3$, and filter $302_4$ transmits wavelength $\lambda_4$, As a result, photodiodes $310_1$-$310_4$ respectively receive light of wavelengths $\lambda_1$-$\lambda_4$, and similarly, photodiodes $320_1$-$320_4$ respectively receive light of wavelengths $\lambda_1$-$\lambda_4$. As also illustrated in FIG. 3, each of the filters $302_1$-$302_4$, and the top, inner surface of the guiding structure 300 acts as a reflector for light received from the coupling surfaces 202 of the coupling mirror 200 and/or from other filters to direct light to the filters.

Figure 5:
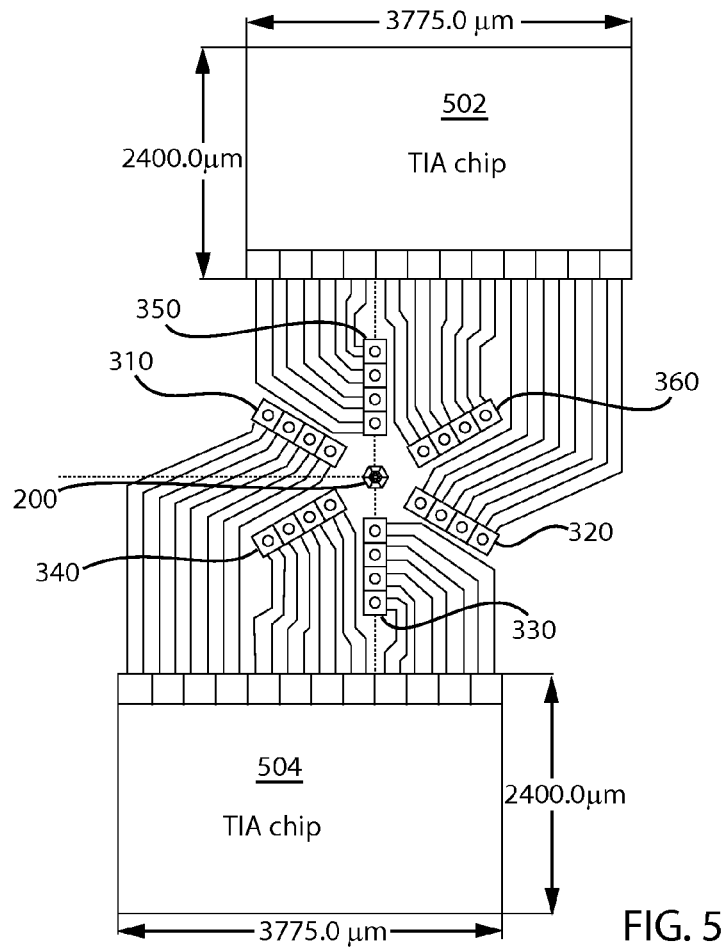
FIG. 5 is a top view of an electrical configuration for a receiver/demultiplexer structure in accordance with an embodiment of the present invention.
Figure 6:
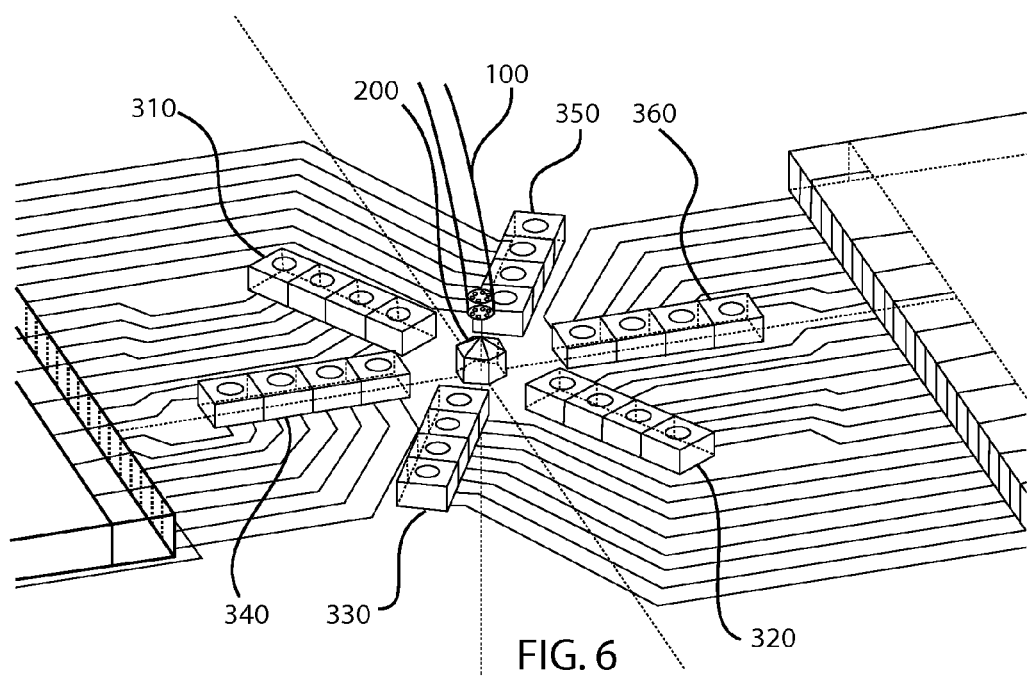
FIG. 6 is an alternative view of an electrical configuration for a receiver/demultiplexer structure in accordance with an embodiment of the present invention.

With regard to packaging and electrical considerations, FIGS. 5 and 6 illustrate the electrical configuration for a receiver/demultiplexer structure, which includes two transimpedance amplifier (TIA) driver chips 502 and 504 having 12 channels for each chip. In the system, a structure in which the light travels through the substrate can be chosen so that ground and signal contacts are on the same plane as shown in FIG. 6. This structure can be placed on a multi-chip module board along with a transmitter/multiplexer structure of similar size.

Figure 7:
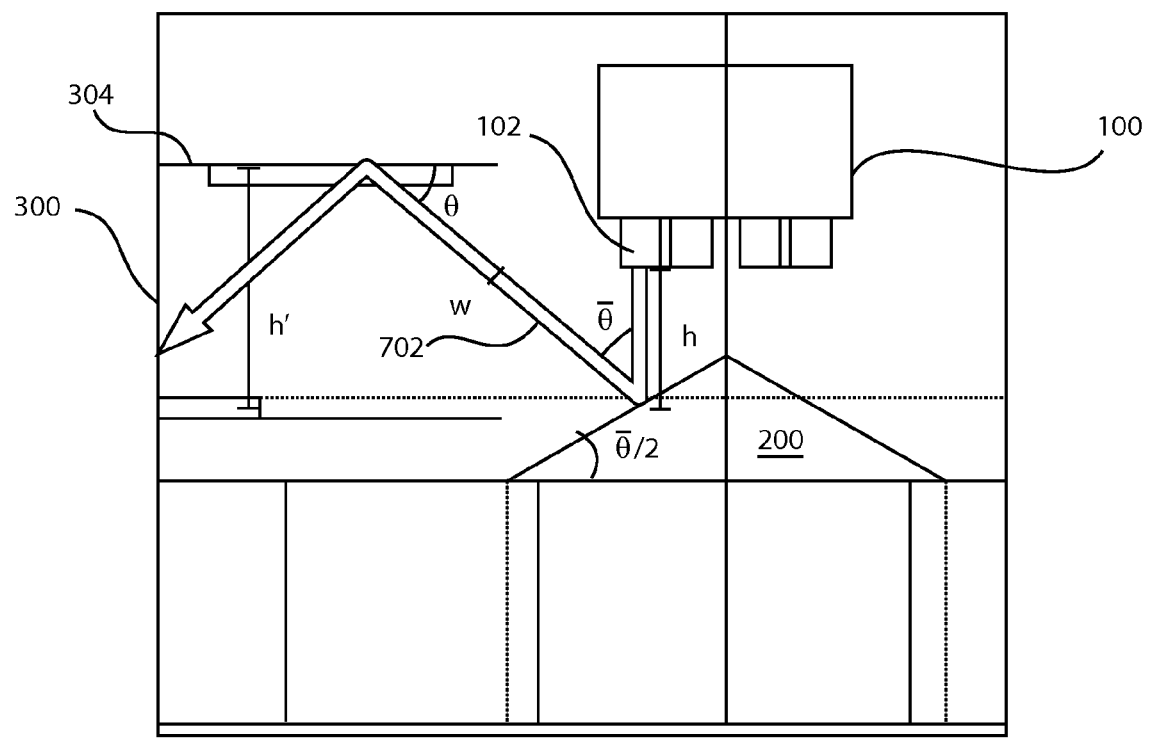
FIG. 7 is a cross-sectional diagram illustrating an alignment between a multi-core fiber and a coupling mirror of a wavelength division demultiplexing system in accordance with an exemplary embodiment of the present invention.

Referring now to FIG. 7, some preferred dimensional and geometric features are illustrated for the receiver/demultiplexer structure 390. The same configurations can be employed for the transmitter/multiplexer structure. Here, the thickness h' is preferably about 125 μm if θ=45°, which corresponds to half the pitch of the photodiode mesas. All parameters can be adjusted based on basic geometric considerations, depending on the light beam width. For example, for $\theta=\overline{\theta}=45°$, h'=125 μm and w=26 μm, h≥42 μm.

Figure 8:
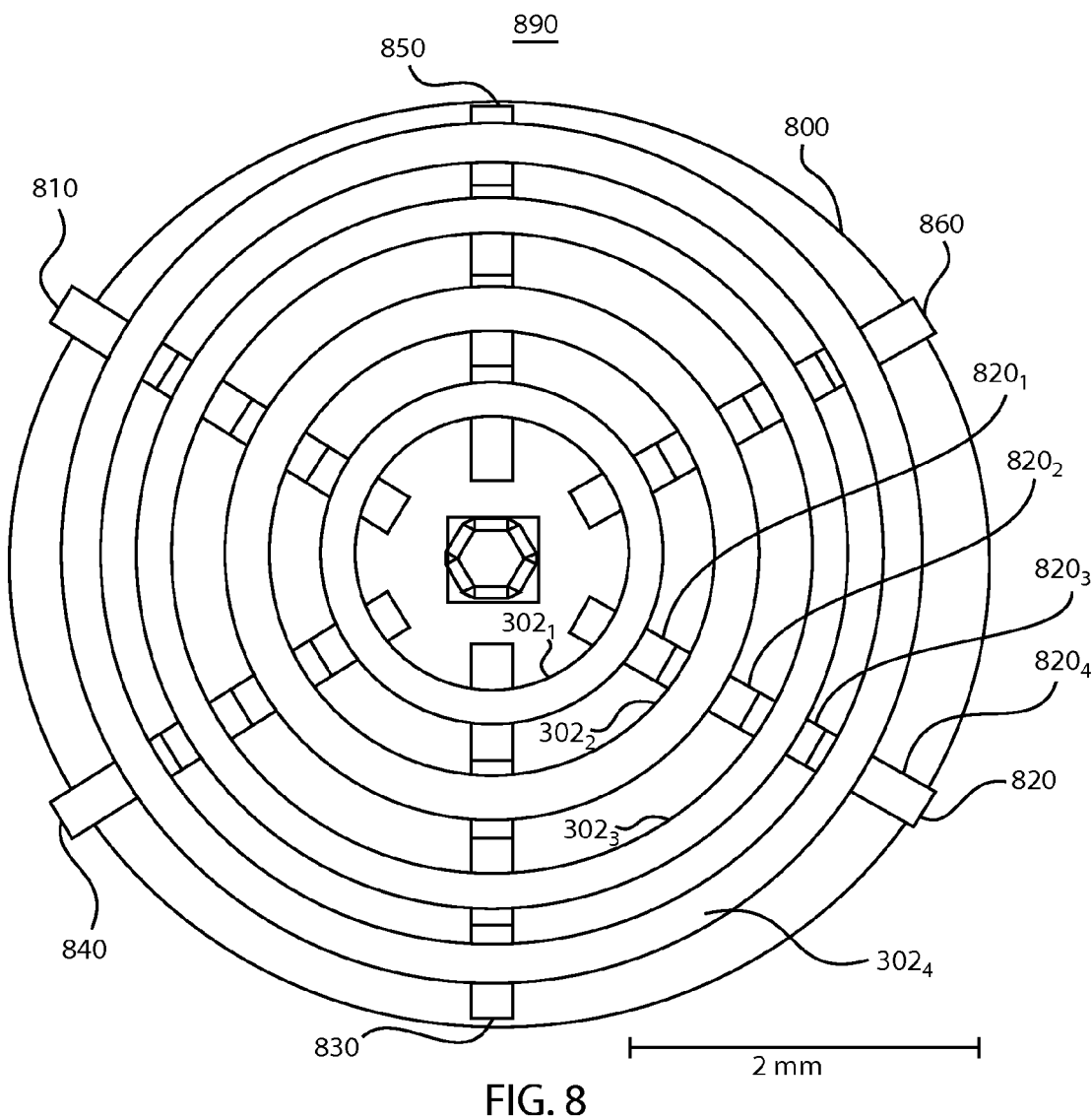
FIG. 8 is a top view of a wavelength division multiplexing system in accordance with an exemplary embodiment of the present invention.

Referring to FIG. 8, a top view of a multiplexer/transmitter optical system 890 is illustrated. The mirror 200 along with the same filters $302_1$-$302_4$ described above can be employed in the system 800 in a similar manner. For example, the mirror 200 here would act as a coupling mirror that is aligned with an optical fiber 100 in the same manner discussed above with respect to FIGS. 2-4. As such, each of the angled surfaces is configured to direct light to a different core of the multi-core fiber. Here, the optical path is reversed from the demultiplexer configuration illustrated in FIGS. 3-4.

Figure 9:
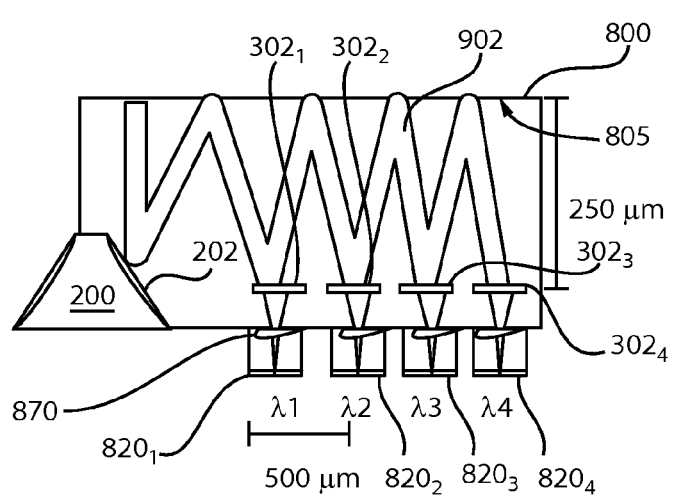
FIG. 9 is a cross-sectional view of a portion of a wavelength division multiplexing system in accordance with an exemplary embodiment of the present invention.

In addition, the filters $302_1$-$302_4$ act as micro-mirrors that direct light 902 towards the coupling mirror 200. However, here, as opposed to including photodiode arrays, the system 890 includes individual VCSEL chips arranged in VCSEL chip sets 810, 820, 830, 840, 850 and 860. For example, as illustrated in FIG. 9, the VCSEL chip set 820 includes VCSEL chips $820_1$, $820_2$, $820_3$, and $820_4$, where VCSEL chip $820_1$ emits at wavelength $\lambda_1$, VCSEL chip $820_2$ emits at wavelength $\lambda_2$, VCSEL chip $820_3$ emits at wavelength $\lambda_3$, VCSEL chip $820_4$ and emits at wavelength $\lambda_4$. As discussed above, filter $302_1$ reflects wavelengths $\lambda_2$-$\lambda_4$ and transmits wavelength $\lambda_1$, filter $302_2$ reflects wavelengths $\lambda_3$ and $\lambda_4$ and transmits wavelength $\lambda_2$, etc. Thus, the VCSEL chips $820_1$-$820_4$ are disposed beneath filters $302_1$-$302_4$, as illustrated in FIGS. 8 and 9. The other VCSEL chip sets 810, 830, 840, 850 and 860 are structured in the same manner as the VCSEL chip set 820 so that they include four VCSEL chips, each of which transmits a different one of wavelengths $\lambda_1$-$\lambda_4$. As noted above with respect to FIGS. 3 and 4, a different number of wavelengths can be employed in alternative embodiments. The other VCSEL chip sets 810, 830, 840, 850 and 860 are also aligned with the filters $302_1$-$302_4$ in a manner that is similar to the manner in which the VCSEL chip set 820 is aligned with the filters $302_1$-$302_4$. Thus, each filter/micro-mirror is configured to receive and transmit light from one respective laser chip from each set of the sets of laser chips. For example, the filter/micro-mirror $302_1$ can receive and transmit light from the laser chip of each set 810, 820 830, 840, 850 and 860 that emits at wavelength $\lambda_1$, the filter/micro-mirror $302_2$ can receive and transmit light from the laser chip of each set 810, 820 830, 840, 850 and 860 that emits at wavelength $\lambda_2$, the filter/micro-mirror $302_3$ can receive and transmit light from the laser chip of each set 810, 820 830, 840, 850 and 860 that emits at wavelength $\lambda_3$ and the filter/micro-mirror $302_4$ can receive and transmit light from the laser chip of each set 810, 820 830, 840, 850 and 860 that emits at wavelength $\lambda_4$, In accordance with one preferred aspect, an asymmetric lens 870 is formed directly on each laser chip of each set 810, 820, 830, 840, 850, 860 such that the lenses 870 are disposed beneath the filters $302_1$-$302_4$. Thus, each of the asymmetric lenses 870 is configured to direct light from one respective laser of the sets of laser chips. The asymmetric lenses 870 are configured to direct light emitted from the VCSELs with a given angle to ensure that the light reaches the surface 202 of the mirror 200.

As illustrated in FIG. 9, the guiding structure 800 and the filters/micro-mirrors $302_1$-$302_4$ can combine at least a portion of the light transmitted from each set of the sets 810, 830, 840, 850 and 860 of laser chips and direct the combined light to the coupling mirror 200. The top, inner surface 805 of the guiding structure 800 acts as a reflector that is configured to direct the light transmitted from each laser chip of the sets 810, 830, 840, 850 and 860 of laser chips to the coupling mirror 200. As such, for each set of the sets of laser chips 810, 820 830, 840, 850 and 860, the structure is configured to amalgamate the light from each laser chip in the set and direct the amalgamated light to the coupling mirror 200 such that each of the surfaces 202 receives the light from a different set of the sets of laser chips 810, 820 830, 840, 850 and 860.

In accordance with one exemplary aspect, compared to the optical system described above with respect to FIGS. 3 and 4, the vertical path thickness of the guiding structure 800 could be increased to increase the pitch between the filters and leave enough space to position individual chips. For example, the vertical path length can be doubled to 250 µm to double the pitch between the filters/lenses 870 and between the laser chips of the sets to 500 µm.

Figure 10:
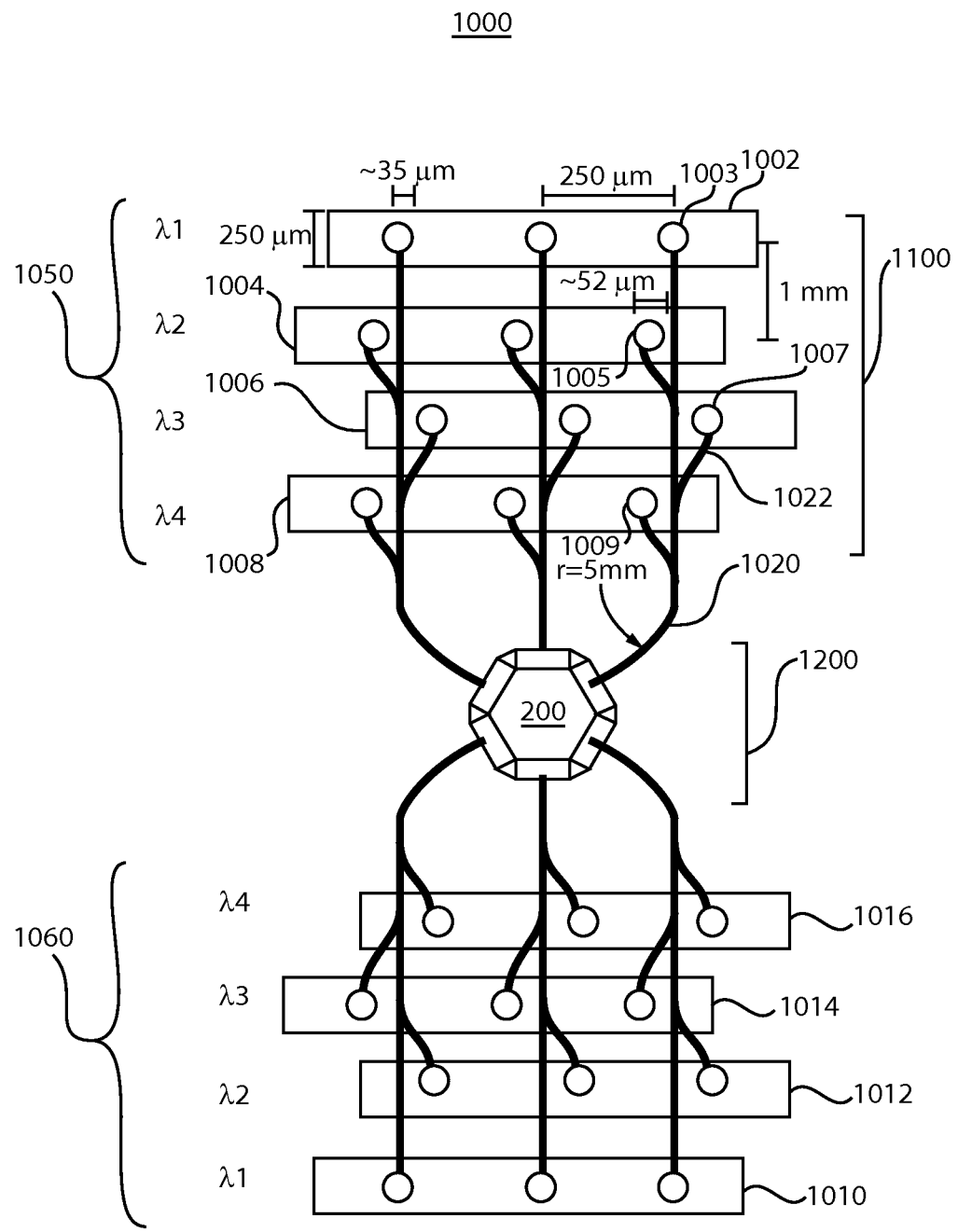
FIG. 10 is a top view of a wavelength division multiplexing system in accordance with an alternative exemplary embodiment of the present invention.
Figure 11:
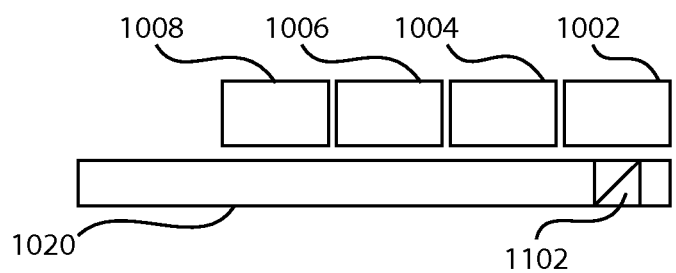
FIG. 11 is a cross-sectional view of a portion of a wavelength division multiplexing system illustrating an exemplary optical coupling between laser chips and a waveguide in accordance with the alternative exemplary embodiment of the present invention.

Referring now to FIG. 10, a top view of an alternative embodiment 1000 of an optical system for WDM in a transmitter in which VCSEL arrays can be used is illustratively depicted. Here, the mirror 200 described above can be employed in the system 1000 in a similar manner in which it was employed in the system 800. For example, the mirror 200 here would act as a coupling mirror that is aligned with an optical fiber 100 in the same manner discussed above with respect to FIGS. 2-4 and with respect to FIGS. 8-9. As such, each of the angled surfaces is configured to direct light to a different core of the multi-core fiber. In accordance with the embodiment in FIG. 10, two sets of VCSEL arrays 1050 and 1060 are employed, where each array employs three channels. For example, the set 1050 includes four arrays 1002, 1004, 1006 and 1008. Similarly, the set 1060 also includes four arrays 1010, 1012, 1014 and 1016 so that there are eight VCSEL arrays in total in this particular embodiment. Each of the VCSEL arrays includes three VCSEL chips. In addition, laser devices within each of the arrays emit light at a common wavelength. For example, the array 1002 includes three VCSEL chips 1003 that emit light at wavelength $\lambda_1$, the array 1004 includes three VCSEL chips 1005 that emit light at wavelength $\lambda_2$, the array 1006 includes three VCSEL chips 1007 that emit light at wavelength $\lambda_3$ and the array 1008 includes three VCSEL chips 1009 that emit light at wavelength $\lambda_4$. The laser arrays 1010, 1012, 1014 and 1016 are configured in the same manner such that each laser in a given array emits light at the same wavelength, where each array 1010, 1012, 1014 and 1016 respectively emits light at wavelengths $\lambda_1$-$\lambda_4$. As depicted in FIG. 10, the system includes six waveguides 1020, each of which combine at least a portion of the light transmitted from each of the arrays in one of the sets 1050 or 1060. As illustrated in FIG. 11, which provides a cross-sectional view of element 1100 in FIG. 10 along the center of the rightmost VCSEL of set 1002, light from each of the VCSEL devices is coupled into the waveguide structure using forty-five degree micro-mirrors 1102. In particular, the forty-five degree micro-mirrors 1102 are employed to couple VCSEL light into the waveguide 1020 or 1022 from a laser chip. Further, each of the micro-mirrors 1102 in a given waveguide 1020 or 1022 receives light from a different array of laser chips. It can be shown that bending loss for the system 1000 is less than 3 dB for an r=5 mm radius for the waveguide 1020. It can also be shown that it is possible to realize a 'y' coupling structure 1022 with a loss lower than 0.5 dB. Implementation of the embodiment 1000 or 890 with embodiment 300 is compatible with a typical optical interconnect link for which the total power budget is about 10-12 dB.

Figure 12:
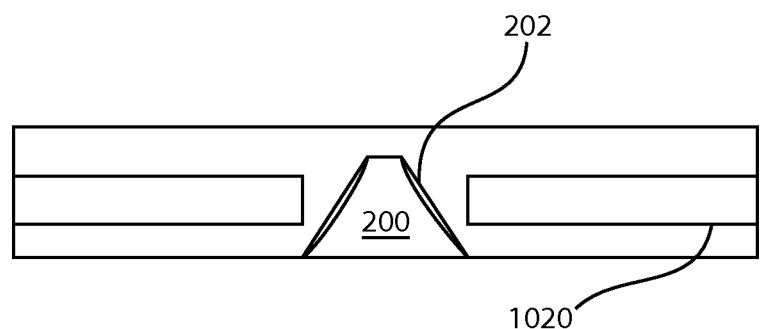
FIG. 12 is a cross-sectional view of a portion of a wavelength division multiplexing system illustrating an alignment between waveguides and a coupling mirror in accordance with the alternative exemplary embodiment of the present invention.

As illustrated in FIG. 12, which provides a cross-sectional view of element 1200 in FIG. 10, each of the waveguides 1020 direct the combined light to a different surface 202 of the coupling mirror 200. As shown in FIG. 12, each of the waveguides 1020 is optically coupled to a different one of the angled surfaces 202 of the coupling mirror 200. Thus, the system includes one waveguide structure 1020 per mirror face. It should be noted that six waveguide structures 1020 are employed here because the multi-core fiber for which the transmitter system is designed in this example has six cores. However, in alternative embodiments, different numbers of waveguide structures 1020 can be employed. "y"-shaped couplers 1022 are used as needed to combine light from VCSEL devices with different wavelengths from the arrays 1050 or 1060 into the main waveguide cores. For example, a waveguide 1020 that is coupled to the set 1050 receives light from one of the lasers 1003 of the array 1002, one of the lasers 1005 of array 1004, one of the lasers 1007 of array 1006 and one of the lasers 1009 of array 1008. Near the mirror 200, waveguides are curved as needed to have an orientation perpendicular to the mirror base such that light is reflected from one of the surfaces 202 into one of the cores of the fiber 102, as illustrated in FIG. 12. The curved waveguide portion has a radius optimized to avoid excessive bending and propagation losses (of the order of several millimeters). The entire waveguide structure can be fabricated using lithography technology to create the desired pattern.

Figure 13:
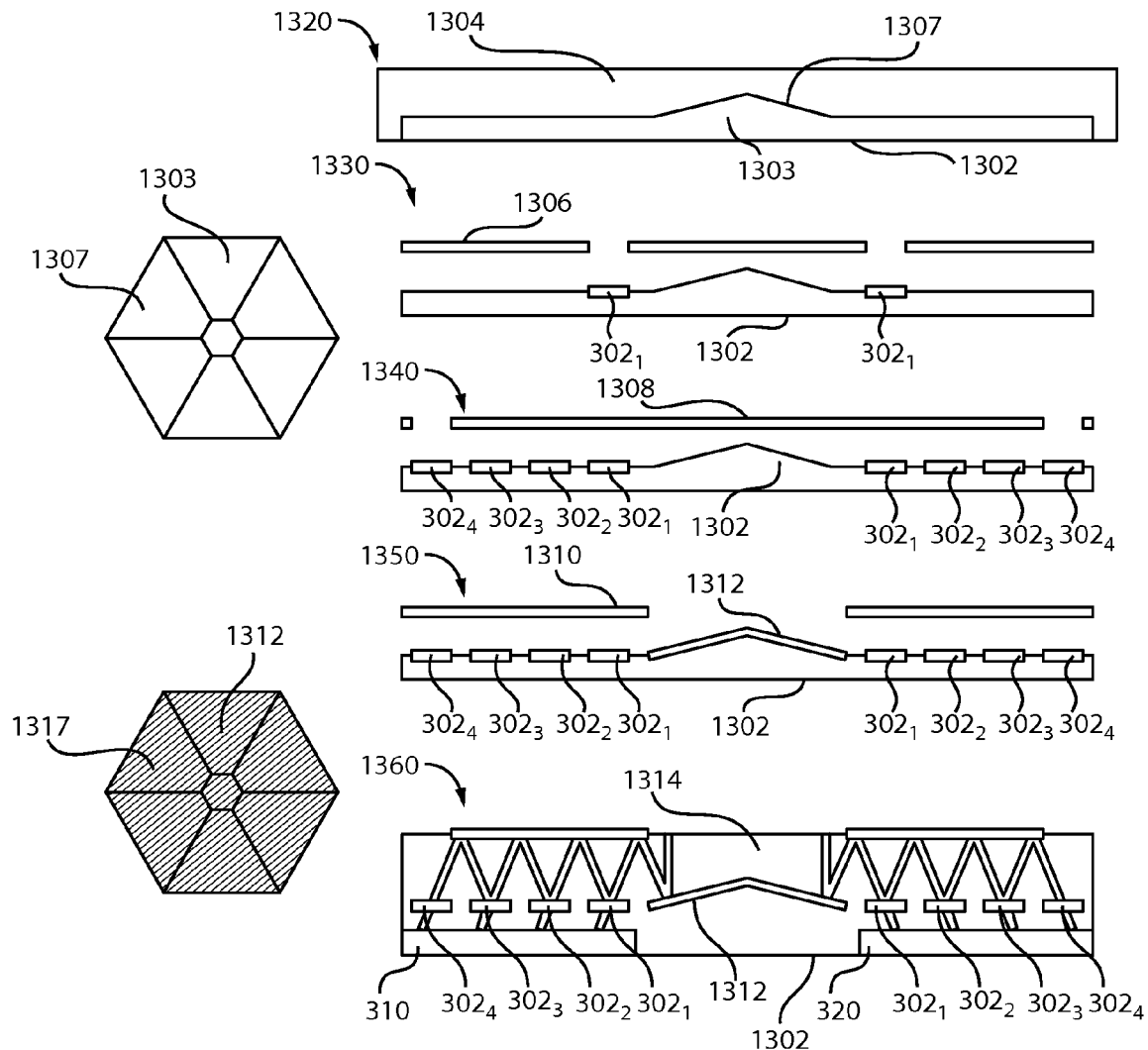
FIG. 13 is a diagram illustrating various processing stages of a method for fabricating an optical system in accordance with an exemplary embodiment of the present invention.
Figure 14:
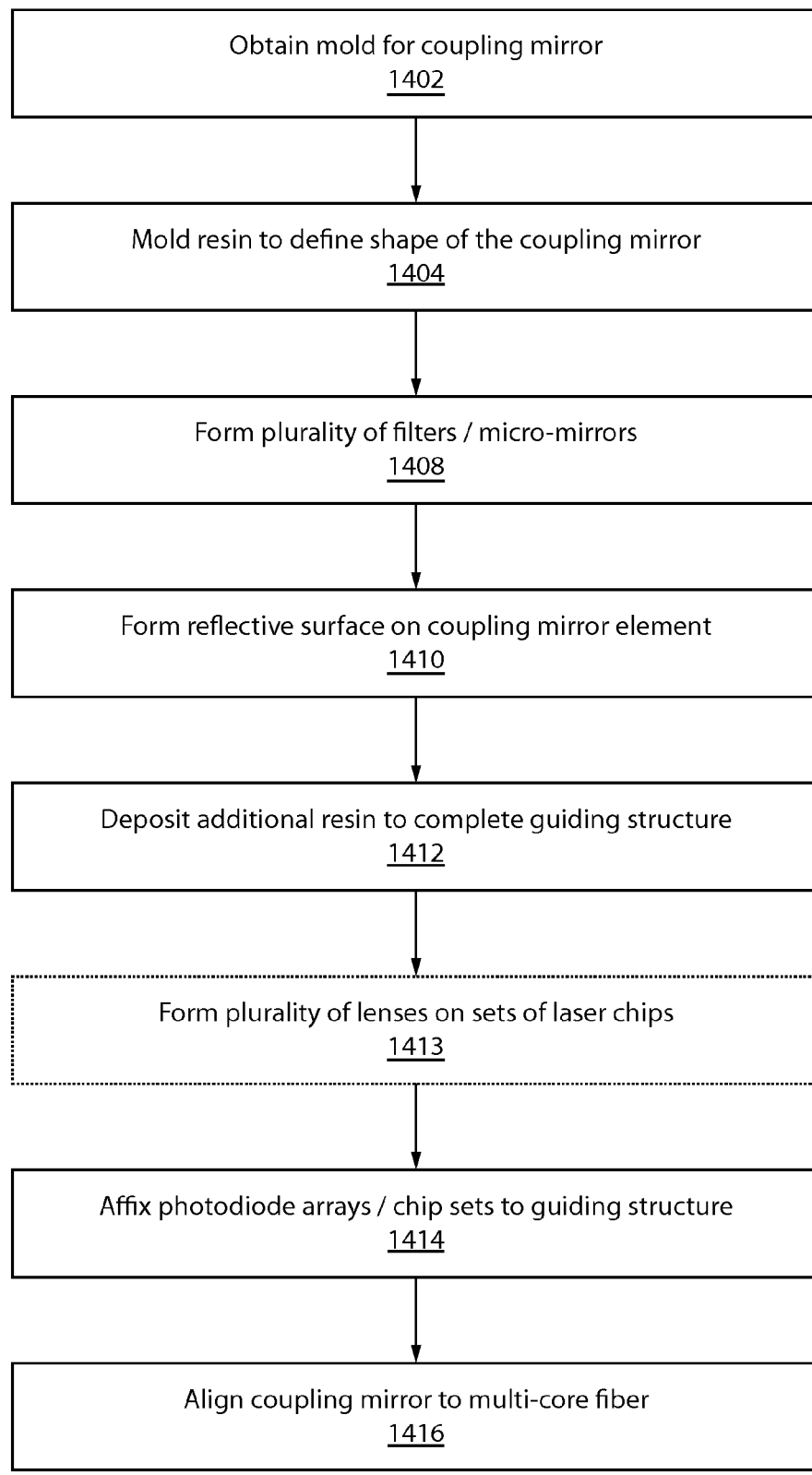
FIG. 14 is a flow diagram of a method for fabricating optical systems in accordance with exemplary embodiments of the present invention.

Referring now to FIGS. 13 and 14, various processing stages and a flow diagram of a method 1400 for fabricating optical systems in accordance with exemplary embodiments are illustratively depicted. For illustrative purposes, the particular processing stages of FIG. 13 depict the method 1400 as applied to fabricate a demultiplexer optical system 390 illustrated in FIGS. 3 and 4. However, it should be understood that the method 1400 can also be applied to fabricate the multiplexer optical system 890 illustrated in FIGS. 8 and 9. Relevant steps of this method can be performed to also fabricate the multiplexer optical system 1000 illustrated in FIG. 10.

The method 1400 can begin at step 1402, at which a mold for a coupling mirror is obtained. For example, the reusable mold 1304, illustrated in stage 1320 of FIG. 13, can be fabricated using high precision micro-machining techniques.

At step 1404, a resin is molded to define the shape of a coupling mirror element. For example, the mold 1304 can be employed to define an element 1303 in the mold 1304, which includes a plurality of angled surfaces 1307. Here, the angled surfaces 1307, after making the surfaces 1307 reflective as discussed below with respect to step 1410, provide the same function as the angled surfaces 202 described above with respect to the WDDM embodiment 390 and the WDM embodiment 890. In alternative embodiments, the mirror 200 can be formed using an appropriate mold. In either the WDDM or the WDM systems, the resin 1302 can be photo-hardened to define shape of coupling mirror.

At step 1408, a plurality of filters/micro-mirrors is formed. For example, for both the WDDM and the WDM systems, as illustrated in stages 1330 and 1340 of FIG. 13, the filters/micro-mirrors $302_1$-$302_4$ can be formed around the coupling element, as discussed above with respect to FIGS. 3, 4, 8 and 9. As discussed above, each of the filters/micro-mirrors is configured to filter at least one respective wavelength and transmit at least one other respective wavelength. In particular, in the preferred embodiment, each of the filters/micro-mirrors is configured to transmit only one wavelength and reflect the others as needed for a multiplexing scheme. As also illustrated in stages 1330 and 1340 of FIG. 13, the filters/micro-mirrors $302_1$-$302_4$ can be formed by applying a different mask for each of the filters, such as, for example, mask 1308. As noted above, the filters/micro-mirrors $302_1$-$302_4$ can be formed as concentric discs that are disposed around the coupling element 1303/200. Each of the filters/micro-mirrors $302_1$-$302_4$ can be composed of a dielectric material and can be formed by evaporation, using, for example a $TiO_2$/$SiO_2$ multi-layer with the thickness of the layers adjusted differently for each filter to obtain the desired spectral characteristics. To fabricate a WDM system, the filters/micro-mirrors $302_1$-$302_4$ can be formed around the coupling element 1303/200 such that each of the filter/micro-mirrors $302_1$-$302_4$ is disposed above a different opto-electronic device, as discussed above with respect to FIGS. 8 and 9.

At step 1410, a reflective surface is formed on the coupling mirror element. For example, for both of the WDDM and WDM systems, reflective surfaces can be formed on the angled surfaces 1307/202. For example, as illustrated in stage 1350, using a mask 1310, a metal, for example, gold, can be evaporated on the mirror element 1303/200 to form reflective surfaces 1317 on surfaces 1307/202 and thereby form the coupling mirror 1312.

At step 1412, additional resin is deposited to complete the guiding structure. For example, for the WDDM system, as illustrated by stage 1360 of FIG. 13, the additional resin can be deposited over the coupling element 1312/200 and over the filters/micro-mirrors $302_1$-$302_4$ to complete the guiding structure 1314/300. Alternatively, for the WDM system, the additional resin can be deposited over the coupling element 200, the filters/micro-mirrors $302_1$-$302_4$ to complete the guiding structure 800. For both the WDDM and the WDM systems, the additional resin can be photo-hardened and at least a portion of the metal used to form the reflective surfaces 1317 can be evaporated. As discussed above with respect to the WDDM system 390, the top, inner surface of the hardened resin of the guiding structure 1314/300 can act as a reflector configured to direct light to each of the filters $302_1$-$302_4$.

At step 1414, photodiode arrays/individual VCSEL chips are affixed to the structure. For example, as illustrated by stage 1360 in FIG. 13 for a WDDM system, and as discussed above with respect to FIGS. 3 and 4, arrays of photodiodes 310, 320, 330, 340, 350 and 360 can be attached to the structure 1314/300 beneath the filters $302_1$-$302_4$. Alternatively, for the WDM system, a plurality of sets of laser chips can be affixed to the structure 800 where, in each set of the sets of laser chips 810, 820, 830, 840, 850 and 860, each laser chip transmits light at a different wavelength, as discussed above with respect to FIGS. 8 and 9. On each laser chip, before performing the affixing step, for example at step 1413, an asymmetric lens 870 is fabricated such that the light emitted from the chip is collimated and has an angle from the surface normal such that it reaches one of the filters $302_1$-$302_4$ in FIG. 8 and the coupling element 1312/200. Thus, each lens is formed on a different one of the laser chips of the sets of laser chips. Although the lens formation step 1413 is illustrated in FIG. 14 as being performed after step 1412, the lens formation step can be formed at any time before step 1414. As also noted above, the top, inner surface of the hardened resin of the structure 800 can act as a reflector configured to direct the light transmitted from each laser chip of the sets of laser chips to the coupling mirror element 1312/200. Further, as also noted above with respect to FIGS. 8 and 9, for each set of lasers, the structure 800 is configured to amalgamate the light from each laser chip in the set and direct the amalgamated light to the coupling mirror element 200 such that each of the reflective surfaces 202 receives the light from a different set of the plurality of sets of laser chips 810, 820, 830, 840, 850 and 860.

At step 1416, the coupling mirror is aligned to the multi-core fiber. For example, for the WDDM system, as discussed above with respect to FIGS. 3 and 4, the coupling mirror element 200/1312 can be butt-coupled to and aligned with the multi-core fiber 100 such that each of the angled surfaces 202/1317 is aligned with and receives light from a different core 102 of the multi-core fiber 100. Alternatively, for the WDM system, as discussed above with respect to FIGS. 8 and 9, the coupling mirror element 200/1312 can be aligned with the multi-core fiber 100 such that each of the angled surfaces 202/1317 is configured to direct light to a different core 102 of the multi-core fiber 100.

In accordance with preferred embodiments of the present invention, opto-electronic chip arrays with standard pitch can be employed with multi-core fibers if the multiplexing structure 1000 is used. For either multiplexer configuration 800 or 1000, in a single fiber, twenty-four data channels can be transmitted, as opposed to only one channel with a conventional single core fiber that does not employ WDM. As a result, the number of fibers for rack-to-rack and drawer-to-drawer data transfer in high performance computers could be drastically decreased with preferred embodiments of the present invention. Furthermore, the preferred embodiments also avoid electrical cross-talk that can be encountered in a receiver device that employs individual chips positioned directly next to a multi-core fiber, as the preferred embodiments transmit the signal optically near the fiber.

Having described preferred embodiments of systems, methods and devices for WDM and WDDM with a multi-core fiber (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An optical system for wavelength division demultiplexing with a multi-core fiber comprising:
   a mirror including a plurality of angled surfaces that are configured to reflect light transmitted from the multi-core fiber;
   a plurality of filters, wherein each of said filters is configured to receive at least a portion of the reflected light, filter at least one respective wavelength from said portion of the reflected light and transmit at least one other respective wavelength of said portion; and
   a plurality of photodiodes that are aligned with the filters, wherein each given photodiode of the plurality of photodiodes receives the light of the transmitted wavelength from the filter to which the given photodiode is aligned.

2. The optical system of claim 1, wherein each of the angled surfaces is aligned with and receives light from a different core of said multi-core fiber.

3. The optical system of claim 2, wherein the multi-core fiber has six cores around an axis of the fiber and wherein the mirror is hexagonal and disposed at a center of said fiber.

4. The optical system of claim 1, wherein the plurality of filters are spaced apart and disposed around the mirror.

5. The optical system of claim 4, wherein the plurality of filters are concentric discs that are disposed around the mirror.

6. The optical system of claim 1, further comprising:
   a reflector configured to direct the reflected light to each of the filters.

7. An optical system for wavelength division multiplexing with a multi-core fiber comprising:
   a coupling mirror including a plurality of angled surfaces, wherein each of the angled surfaces is configured to direct light to a different core of the multi-core fiber;
   a plurality of sets of laser chips, wherein, in each set of the sets of laser chips, each laser chip transmits light at a different wavelength; and
   a guiding structure configured to combine at least a portion of the light transmitted from at least one of the sets of laser chips and direct the combined light to the coupling mirror.

8. The optical system of claim 7, wherein the multi-core fiber has six cores around an axis of the fiber and wherein the mirror is hexagonal and disposed at a center of said fiber.

9. The optical system of claim 7, wherein the guiding structure further comprises a set of micro-mirrors, wherein each of the micro-mirrors is configured to receive light from one respective laser chip from each set of the sets of laser chips.

10. The optical system of claim 9, wherein the micro-mirrors are spaced apart and disposed around the coupling mirror.

11. The optical system of claim 10, wherein the micro-mirrors are formed as concentric discs that are disposed around the coupling mirror.

12. The optical system of claim 9, wherein the guiding structure further comprises sets of asymmetric lenses between the set of micro-mirrors and lasers of the sets of laser chips, wherein each of the asymmetric lenses is configured to direct light from one respective laser of the sets of laser chips.

13. The optical system of claim 12, wherein said laser chips are vertical cavity surface emitting laser (VCSEL) chips.

14. The optical system of claim 7, wherein the guiding structure further comprises a reflector configured to direct the light transmitted from each laser chip of the sets of laser chips to the coupling mirror.

15. The optical system of claim 7, wherein the guiding structure, for each set of the sets of laser chips, is configured to amalgamate the light from each laser chip in the set and direct the amalgamated light to the coupling mirror such that each of said surfaces receives the light from a different set of said plurality of sets of laser chips.

16. An optical system for wavelength division multiplexing with a multi-core fiber comprising:
   a coupling mirror including a plurality of angled surfaces, wherein each of the angled surfaces is configured to direct light to a different core of the multi-core fiber;
   arrays of laser chips, wherein, in each array of the arrays of laser chips, each laser chip transmits light at a common wavelength; and
   a plurality of waveguides configured to combine at least a portion of the light transmitted from the arrays and direct the combined light to the coupling mirror.

17. The optical system of claim 16, wherein the multi-core fiber has six cores around an axis of the fiber and wherein the mirror is hexagonal and disposed at a center of said fiber.

18. The optical system of claim 16, wherein each of said waveguides is optically coupled to a different one of said angled surfaces.

19. The optical system of claim 16, wherein each of said waveguides includes micro-mirrors, wherein each of said micro-mirrors is configured to receive light from a different one of said arrays.

20. The optical system of claim 16, wherein said laser chips are vertical cavity surface emitting laser (VCSEL) chips.

* * * * *